(12) United States Patent
Grodahl et al.

(10) Patent No.: US 9,559,410 B2
(45) Date of Patent: Jan. 31, 2017

(54) BREAKAWAY MAST

(71) Applicant: Deere & Company, Moline, IL (US)

(72) Inventors: Jason Grodahl, Grimes, IA (US);
Andrew R. Steines, Boone, IA (US);
Ravindragouda K. Patil, Clive, IA (US)

(73) Assignee: DEERE & COMPANY, Moline, IL (US)

( * ) Notice: Subject to any disclaimer, the term of this patent is extended or adjusted under 35 U.S.C. 154(b) by 191 days.

(21) Appl. No.: 14/501,259

(22) Filed: Sep. 30, 2014

(65) Prior Publication Data

US 2016/0093945 A1     Mar. 31, 2016

(51) Int. Cl.
| | |
|---|---|
| *F16M 13/00* | (2006.01) |
| *H01Q 1/32* | (2006.01) |
| *E04H 12/18* | (2006.01) |
| *F16M 11/20* | (2006.01) |
| *H01Q 1/12* | (2006.01) |
| *B60R 11/00* | (2006.01) |

(52) U.S. Cl.
CPC ............. *H01Q 1/3275* (2013.01); *B60R 11/00* (2013.01); *E04H 12/18* (2013.01); *F16M 11/2021* (2013.01); *H01Q 1/12* (2013.01); *H01Q 1/1235* (2013.01); *B60R 2011/004* (2013.01); *B60R 2011/0063* (2013.01); *B60R 2011/0085* (2013.01); *F16M 2200/044* (2013.01)

(58) Field of Classification Search
CPC ..................................................... H01Q 1/3275
USPC ................................................. 248/548, 900
See application file for complete search history.

(56) References Cited

U.S. PATENT DOCUMENTS

| | | | | |
|---|---|---|---|---|
| 5,248,091 | A * | 9/1993 | Thyberg | A01M 7/0075 239/166 |
| 5,364,058 | A * | 11/1994 | Shepherd | B60R 1/0617 248/479 |
| 5,459,476 | A * | 10/1995 | Hsieh | H01Q 1/32 248/289.31 |
| 5,743,635 | A * | 4/1998 | Hulse | B60Q 1/2657 362/294 |
| 6,019,332 | A | 2/2000 | Sweere et al. | |
| 6,546,677 | B1 * | 4/2003 | Featherstone | H01Q 1/08 362/384 |
| 6,872,883 | B2 | 3/2005 | Ginsburg | |
| 6,977,618 | B1 | 12/2005 | Hanewinkel, III et al. | |

(Continued)

FOREIGN PATENT DOCUMENTS

| | | |
|---|---|---|
| CA | 2212220 A1 | 1/1999 |
| EP | 0334610 B1 | 3/1994 |

(Continued)

OTHER PUBLICATIONS

European Search Report issued in counterpart application No. 15182099.0 dated Feb. 26, 2016 (15 pages).

(Continued)

*Primary Examiner* — Bradley Duckworth

(57) ABSTRACT

A sensor mounting bracket for attachment to a vehicle including a mast configured to support a sensor at a first end, a base pivotably connected to the mast at a second end, a shock absorber attached between the mast and the base, wherein the base is attached to a vehicle and the shock absorber predisposes the mast to either a deployed position or a stowed position.

14 Claims, 4 Drawing Sheets

(56) References Cited

U.S. PATENT DOCUMENTS

| | | | |
|---|---|---|---|
| 7,744,229 B2* | 6/2010 | Oehmann | B60R 1/076 248/900 |
| 8,276,325 B2* | 10/2012 | Clifton | H01Q 1/1235 248/540 |
| 9,130,264 B2* | 9/2015 | Gervais | H01Q 1/1235 |
| 2001/0035293 A1 | 11/2001 | Ginsburg | |
| 2003/0183740 A1 | 10/2003 | Knapp | |
| 2006/0285286 A1 | 12/2006 | Littlejohn | |
| 2010/0058635 A1 | 3/2010 | Knapp | |
| 2010/0078905 A1 | 4/2010 | Holtan | |

FOREIGN PATENT DOCUMENTS

| | | |
|---|---|---|
| EP | 1753690 B1 | 4/2012 |
| JP | 2012129667 A | 7/2012 |
| WO | 2005104734 A2 | 11/2005 |

OTHER PUBLICATIONS

CMC BA-130 Break Away Mount, web advertisement.
Tackle Warehouse—MotorGuide Gator Breakaway 20.8 Motor Mount.

\* cited by examiner

BREAKAWAY MAST

FIELD OF THE DISCLOSURE

The present disclosure relates to a breakaway mast for a vehicle.

BACKGROUND

In some instances, sensors must be mounted to vehicles. A mast is often required for mounting such devices to ensure that the vehicle itself does not interfere with the sensor. For example, in some agricultural spraying operations, wind speed and direction data must be collected from sensors spaced far enough away from the vehicle that the vehicle does not influence the data collected by the sensor.

For some ultrasonic wind sensors, the sensor must be a minimum distance (e.g., approximately 22 inches) away from the vehicle when in its deployed position. This distance can vary depending on the specifications of the sensor used. It is not desirable to keep the mast and sensor in the deployed position during transportation of the vehicle due to various height restrictions on roadways and underpasses. Additionally, during travel, the forces exerted on the sensor and the mast when in the deployed position may be detrimental to the mounted sensor. It is therefore desirable to have a sensor mount that can be stowed for travel yet easily deployed for data collection once the data collection site is reached.

Agricultural vehicles are often housed or stored inside buildings such as garages or sheds when not in use. Pulling these vehicles in and out of such buildings with a deployed mast could cause damage to the mast, the attached sensor, the vehicle, or the building. Therefore, it is desirable to have a mast that moves from the deployed position to the stowed position upon impact. Additionally or alternatively, having a mast that shears off to protect the mast, sensor, and vehicle in the event of such an impact would be desirable.

There is a need, therefore, for a mounting bracket that is easily positioned between a stowed position and a deployed position, and that protects the mast, attached sensor, and vehicle in the event of an impact when in the deployed position.

SUMMARY

In one aspect, a sensor mounting bracket for attachment to a vehicle comprises a mast configured to support a sensor at one end and pivotably attached to a base at its other end and also a shock absorber which is coupled between the mast and the base wherein the base is attachable to a vehicle and the shock absorber predisposes the mast to either a deployed position or a stowed position.

In another aspect, the bracket further comprises a channel disposed between the mast and the base wherein the channel is attached to the base at a pivot point and the shock absorber is attached to the mast at one end and the channel at its other end.

The present disclosure further provides a sensor mounting bracket comprising a breakaway connection wherein the breakaway connection comprises fasteners connecting the base to the channel, wherein the fasteners are composed of material of a size and cross section that is susceptible to fracture when sheer stress is transferred through contact of the mast with an object or obstruction (e.g., associated with reverse movement of the mast or vehicle relative to the object).

The above-described features and advantages, as well as others, will become more readily apparent to those of ordinary skill in the art by reference to the following detailed description and accompanying drawings. While it would be desirable to provide a breakaway mast that includes one or more of these advantageous features, the teachings disclosed herein extend to those embodiments which fall within the scope of the appended claims, regardless of whether they accomplish one or more of the above-mentioned advantages.

DETAILED DESCRIPTION

Figure 1:
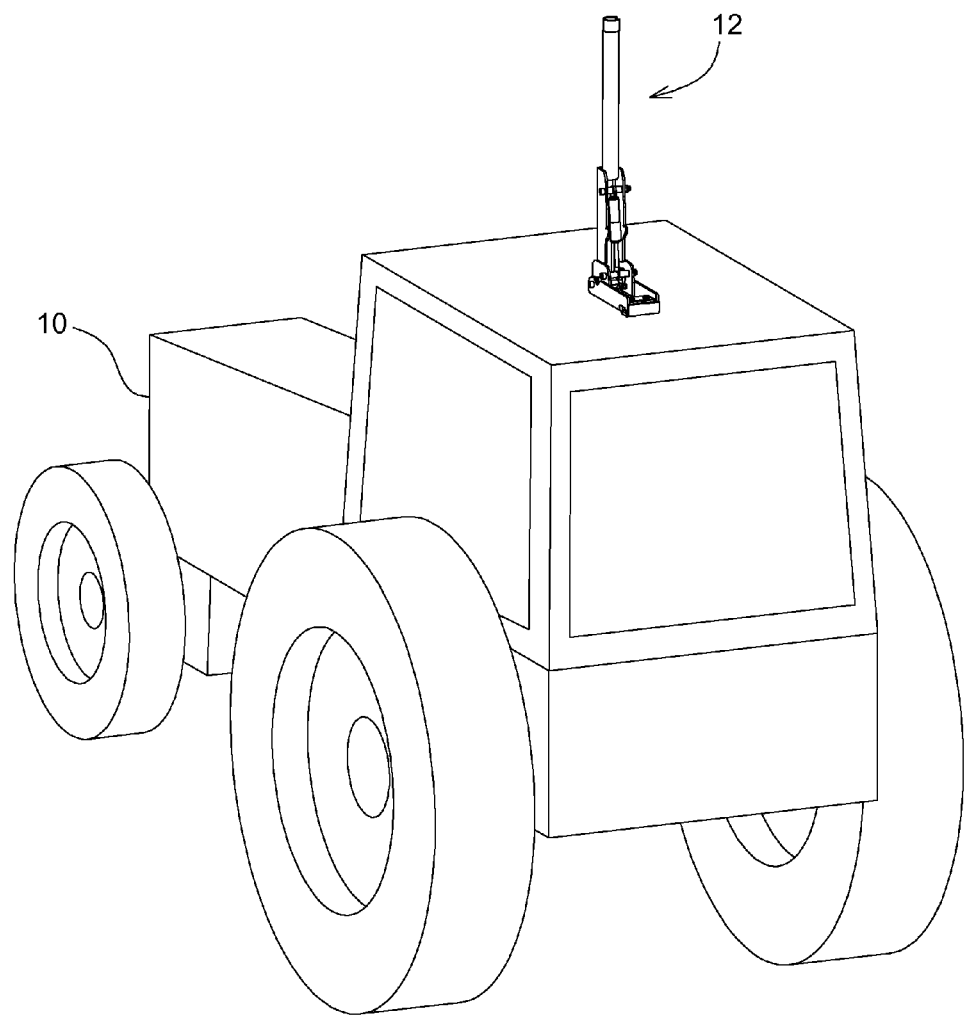
FIG. 1 is a perspective view of a vehicle incorporating features of the present disclosure with the mast in the deployed position

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one embodiment, FIG. 1 illustrates a break-away mast that comprises a mounting bracket 12 for a vehicle and more particularly, a breakaway mounting bracket that is positionable in either a stowed position or a deployed position. Referring to FIG. 1, there is shown a vehicle 10 with a mounting bracket 12 that incorporates features of the present disclosure. In the embodiment shown, the vehicle 10 is an agricultural tractor which is typically used to pull an implement (not shown). However, features of the disclosure could alternatively be used on other vehicles.

Figure 2:
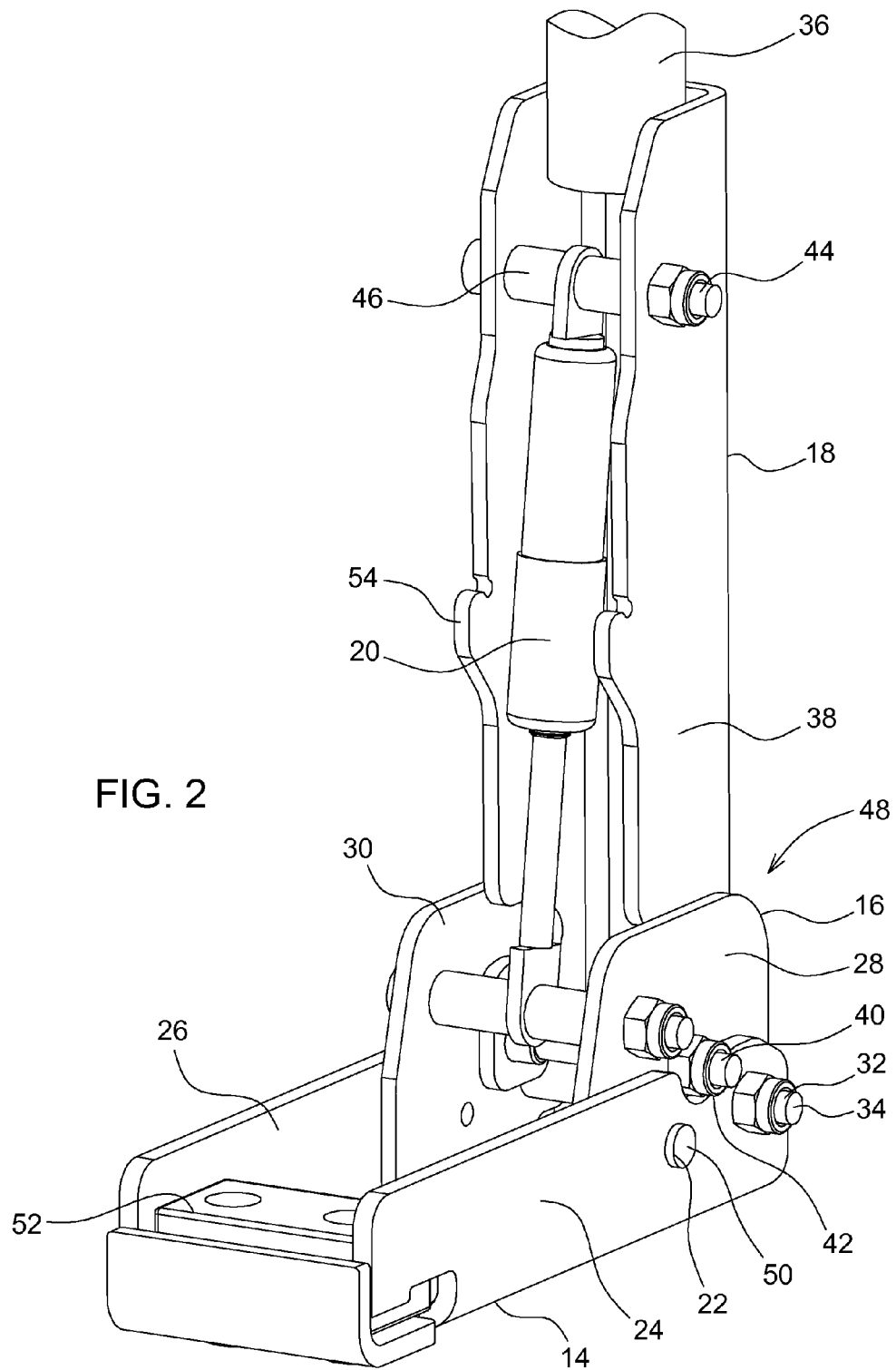
FIG. 2 is a perspective view of the mast in a deployed position.

Referring also to FIG. 2, the mounting bracket 12 is shown in the deployed position. The mounting bracket 12 comprises a base 14, a channel 16, a mast 18, a shock absorber 20, and a breakaway connection 22. The base 14 can be configured to attach to the roof of a vehicle. It can be appreciated that the base 14 can be made from steel or any other suitable material and can be attached to the vehicle with an epoxy or with fasteners or by any other suitable means. In the embodiment shown, base 14 has a generally flat bottom and longitudinal sides 24, 26.

The channel 16 can be made of steel or any other suitable material and is generally u-shaped such that it has a bottom surface with two side surfaces 28, 30. It can be appreciated however, that the shape of the channel is not limited to such configuration so long as the objectives of the disclosure are met. In the embodiment shown, channel 16 is generally disposed within the base 14. Base 14 and channel 16 are fastened together with a fastener 32 thereby creating a pivot point 34 between the base 14 and the channel 16. The fastener 32 can be any suitable fastener including a hardened bolt.

Figure 3:
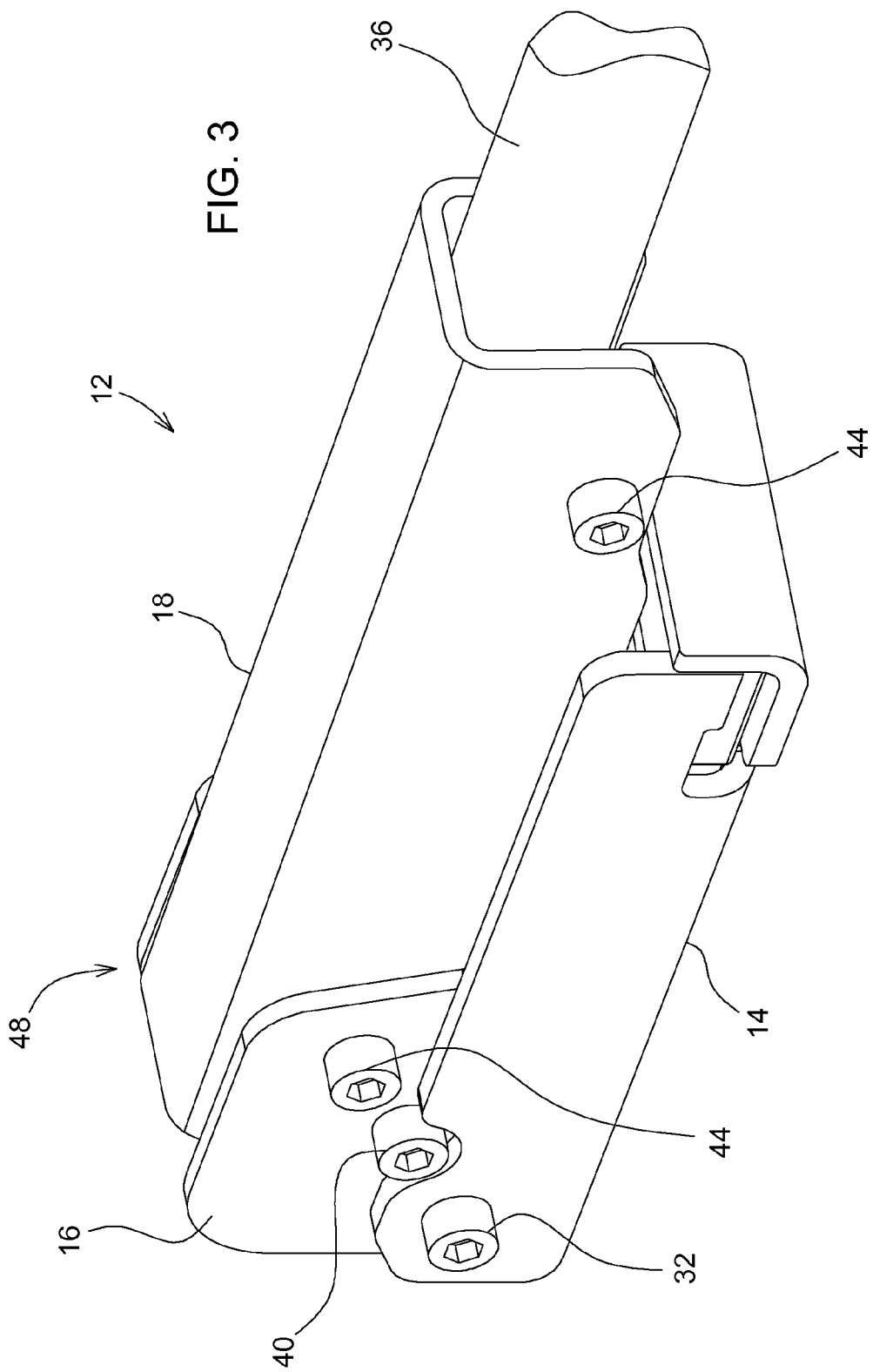
FIG. 3 is a perspective view of the mast in a stowed position.

The mounting bracket 12 includes a mast 18 suitable for mounting a sensor or other suitable equipment. The mast 18 is constructed of a suitable material. The mast 18 can be formed as a weldment or of unitary construction. In the embodiment shown, the mast 18 is a weldment of a cylindrical rod 36 and a support 38. It can be appreciated that the cylindrical rod 36 can be configured to support or engage a sensor or other related device (not shown). The mast 18 and the channel 16 are attached with a fastener 40. It can be appreciated that fastener 40 allows the mast 18 to rotate with respect to the channel 16 which allows the mast 18 to move from a deployed position (FIG. 2) to a stowed position (FIG. 3). In the embodiment shown, the base 14 includes recesses 42 to provide clearance for the fastener 40. Fastener 40 can be any suitable fastener including a hardened bolt.

The shock absorber 20 is attached to the channel 16 at one end and the mast 18 at the other end. The shock absorber 20 can be a gas-filled shock absorber but other types of shock absorbers are contemplated by this disclosure. In the deployed position, the shock absorber 20 can be attached between the mast 18 and the channel 16 with suitable fasteners 44 and spacers 46 or any other suitable means. The shock absorber 20 will absorb some forces during travel, which is often over field terrain which can help protect the sensor or other mounted equipment. In the embodiment shown, the shock absorber is attached as an "over the center" shock absorber which predisposes the mast 18 to either its deployed position (FIG. 2) or its stowed position (FIG. 3). The over the center configuration also allows the operator to position the mast 18 between the deployed position and the stowed position more easily as the shock absorber 20 assists in positioning the mast in either the deployed position or the stowed position. For example, once an operator begins to move the mast 18 from its stowed position to the deployed position the shock absorber 20 will assist once a certain angle between the mast 18 and the channel 16 has been reached. In one embodiment, that angle is approximately 45 degrees or halfway to the deployed position. Conversely, once an operator begins to move the mast 18 from its deployed position to its stowed position, the shock absorber 20 will assist once the mast 18 has been lowered approximately halfway to the stowed position, or approximately 45 degrees.

To help reduce the impact when moving from the deployed position to a stowed position, a bumper 52 may be disposed between the longitudinal sides 24, 26 of base 14. Bumper 52 can be generally rectangular in shape and made of a suitable material such as rubber, though other materials and configurations are contemplated by this disclosure. In addition, stops 54 can also be configured to engage with the bumper 52 when the mast 18 is lowered into the stowed position to further absorb the impact when lowering the mast.

It can be appreciated that the channel 16, mast 18, and shock absorber 20 form a unitary assembly 48 that is attached to the base 14 with fastener 32. The assembly 48 is attached in a manner that allows it to rotate about pivot point 34.

In one embodiment, a breakaway connection 22 comprises one or more fasteners, where each fastener is composed of material of a size and cross section (e.g., elliptical, circular, with or without a notch to facilitate fracture along a radial axis of the notch) that is susceptible to fracture when sheer stress is transferred to it through contact of the mast with an object or obstruction (e.g., associated with reverse movement of the mast or vehicle relative to the object). For example, the breakaway connection 22 or fastener may be composed of a material which is weaker than material forming the base and channel. A material that is weaker means that the material is more susceptible to inelastic deformation, mechanical cutting/cleaving, or fracture from shear stress.

As illustrated in FIG. 2, breakaway connection 22 comprises a pin 50, post or fastener (e.g., screw, rivet, or bolt) which can be constructed of mild steel (a steel with a low carbon content, for example, 0.05% or 0.25%), aluminum, a metal alloy, plastic or polymer material or any other suitable material. Pin 50 connects the base 14 and channel 16 thereby preventing the assembly 48 from being able to rotate about the pivot point 34. Pin 50 is intended to shear off catastrophically in certain instances which will become more readily apparent.

In an embodiment, a first mode of absorbing shock is when the vehicle 10 or mast 18 is traveling in a forward direction and a method of absorbing an impact to the mast 18 is the shock absorber 20 facilitating a folding or rotational movement of the mast 18 to dissipate or absorb the mechanical energy from the impact. Another mode of absorbing shock is when the vehicle 10 or mast 18 is traveling in reverse and a shearing mechanism is used to absorb the mechanical energy from an impact. This mode requires subsequent repair or replacement of the sheared fasteners 50, whereas, the first mode allows the mast 18 to return to normal operation from the resilient action of the shock absorber 20 after the impact.

For example, when the mast 18 is in the deployed position, the mast 18 is subject to various impacts due to its extended height, for example, overhead door beams, bridge underpasses or other objects. If the mast 18 is struck while the vehicle 10 or mast 18 is moving in the forward direction of travel with a force sufficient to overcome the force of the shock absorber 20, the mast 18 will lower to its stowed position. It can be appreciated that the amount of force required for such an impact has to be more than the expected amount of force during travel over field terrain so as to prevent the unexpected lowering of the mast while in its deployed position.

Figure 4:
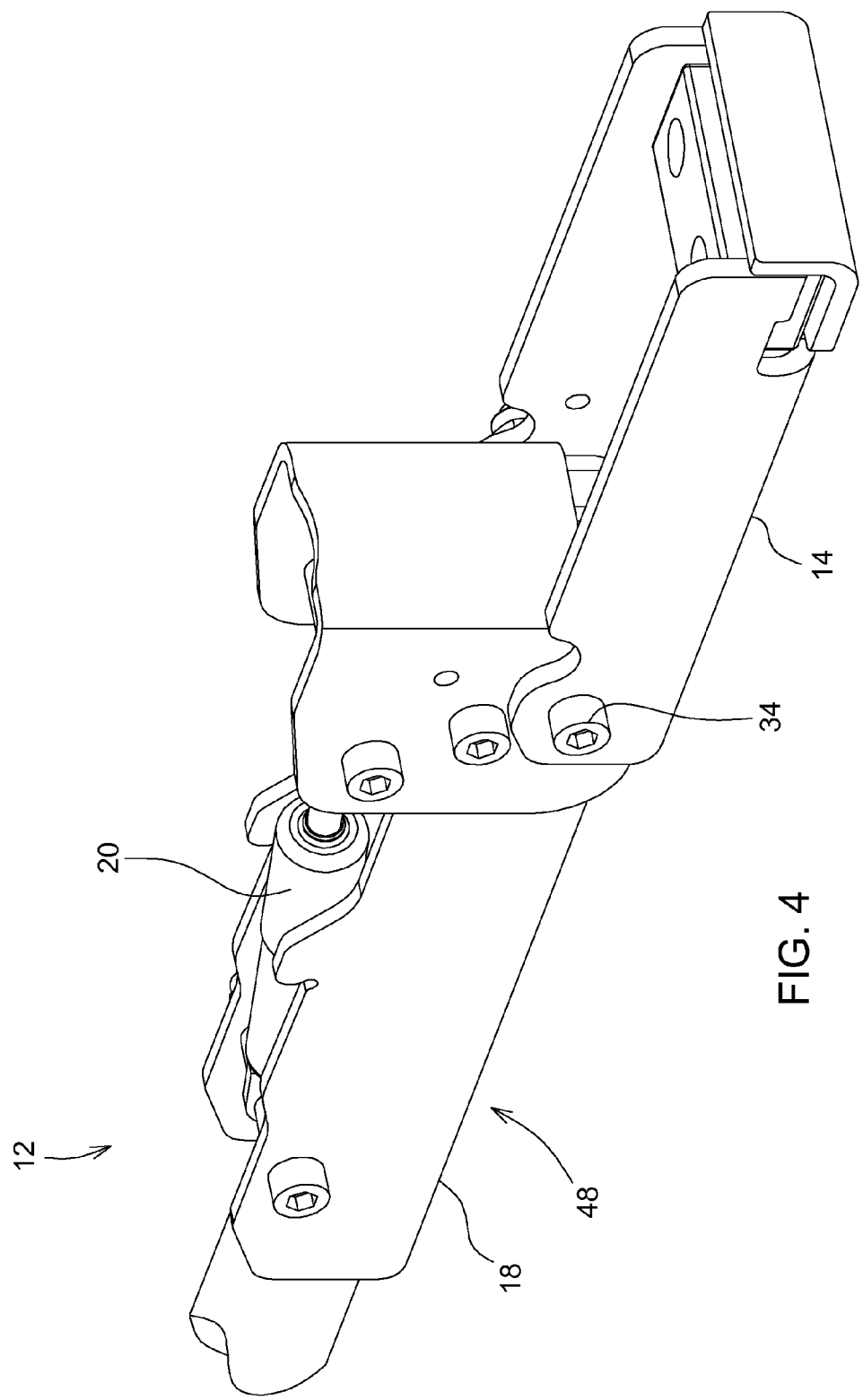
FIG. 4 is a perspective view of the mast in its recoverable position.

Additionally, if the mast 18 is struck while the mast 18 or vehicle 10 is moving in the rearward direction of travel, pin 50 will shear off and/or catastrophically fail. When pin 50 no longer attaches base 14 and channel 16, the assembly 48 is free to rotate about the pivot point 34 and the assembly will rotate to its recoverable position shown in FIG. 4. Thus, an impact that shears off pin 50 will "knock over" the mast and thus reduce potential damage to an attached sensor. It can be appreciated that after such an impact, the assembly 48 can be rotated back to the deployed or stowed position and a replacement pin 50 can be engaged with the base 14 and channel 16.

The foregoing detailed description of one or more embodiments of the breakaway mast has been presented herein by way of example and not limitation. It will be recognized that there are advantages to certain individual features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims.

The invention claimed is:

1. A sensor mounting bracket for attachment to a vehicle comprising:

a mast configured to support a sensor at a first end;
a base, pivotably connected to the mast at a second end;
a shock absorber, attached between the mast and the base;
a channel disposed between the mast and the base wherein the channel is attached to the base at a pivot point and the shock absorber is attached to the mast at one end and the channel at its other end;
a breakaway connection wherein the breakaway connection comprises fasteners connecting the base to the channel, wherein the fasteners are comprised of material which is weaker than material forming the base and channel; and
wherein, the base is attached to a vehicle and the shock absorber predisposes the mast to either a deployed position or a stowed position.

2. The sensor mounting bracket of claim 1, wherein the mast can rotate about the pivot point when the breakaway connection is disengaged from the base or channel.

3. The sensor mounting bracket of claim 2, wherein the mast pivots from the deployed position to the stowed position if impacted while the vehicle is traveling in a forward direction.

4. The sensor mounting bracket of claim 3, wherein the mast pivots from the deployed position to a recoverable position if impacted while the vehicle is traveling in a rearward direction and the impact disengages the breakaway connection fastener from the base or channel.

5. The sensor mounting bracket of claim 4 further comprising a bumper disposed within the base wherein the bumper cooperates with the mast when in the stowed position.

6. A vehicle sensor mounting assembly comprising:
a mast adapted to support a sensor at one end;
a base adapted to attach to a vehicle,
a channel disposed within the base and connected to the base at a pivot point wherein the channel is pivotably attached to the mast at a second end;
a breakaway connection wherein the breakaway connection comprises fasteners connecting the base to the channel, wherein the fasteners are comprised of material which is weaker than material forming the base and channel;
a shock absorber connected to the mast at one end and the channel at the other end;
wherein the mast can be positioned in either a deployed position or stowed position and the shock absorber predisposes the mast to one of those positions.

7. The sensor mounting assembly of claim 6, wherein the mast can rotate about the pivot point when the breakaway connection is disengaged from the base or channel.

8. The sensor mounting assembly of claim 7, wherein the mast pivots from the deployed position to the stowed position if impacted while the vehicle or mast is traveling in a forward direction.

9. The sensor mounting assembly of claim 8, wherein the mast pivots from the deployed position to a recoverable position if impacted while the vehicle or mast is traveling in a rearward direction and the impact disengages the breakaway connection fastener from the base or channel.

10. The sensor mounting assembly of claim 9 further comprising a bumper disposed within the base wherein the bumper cooperates with the mast when in the stowed position.

11. A vehicle mounted sensor bracket comprising:
a mast configured to receive a sensor at a first end;
a base configured to pivotably attach to the mast at a second end;
a shock absorber mounted to the mast at one end and the base at its other end;
the base comprising a channel portion and a vehicle mount portion, wherein the channel portion is attached to the mast, the channel portion is attached to the vehicle mount portion at a pivot point, and the shock absorber is mounted to the mast at one end and the channel portion at its other end;
the base comprising a breakaway connection between the channel portion and the vehicle mount portion wherein the breakaway connection comprises fasteners connecting the channel portion to the vehicle mount portion, wherein the fasteners are comprised of material which is weaker than material forming the channel portion and the vehicle mount portion; and
wherein the base is configured to attach to a vehicle and the shock absorber predisposes the mast to either a deployed position or a stowed position.

12. The sensor bracket of claim 11, wherein the mast rotates from the deployed position to the stowed position upon impact when the vehicle or mast is moving in a forward direction.

13. The sensor bracket of claim 12, wherein the mast rotates from a deployed position to a recoverable position when the breakaway connection is disengaged from the channel portion or the vehicle mount portion upon impact when the vehicle or mast is traveling in a rearward direction.

14. The sensor bracket of claim 13 further comprising a bumper disposed within the base adapted to cooperate with the mast when in the stowed position.

* * * * *